E. R. ANDREWS, R. B. RANDALL & W. H. CLAGUE.
PAPER FEEDING MACHINE.
No. 114,087    Patented Apr. 25, 1871.
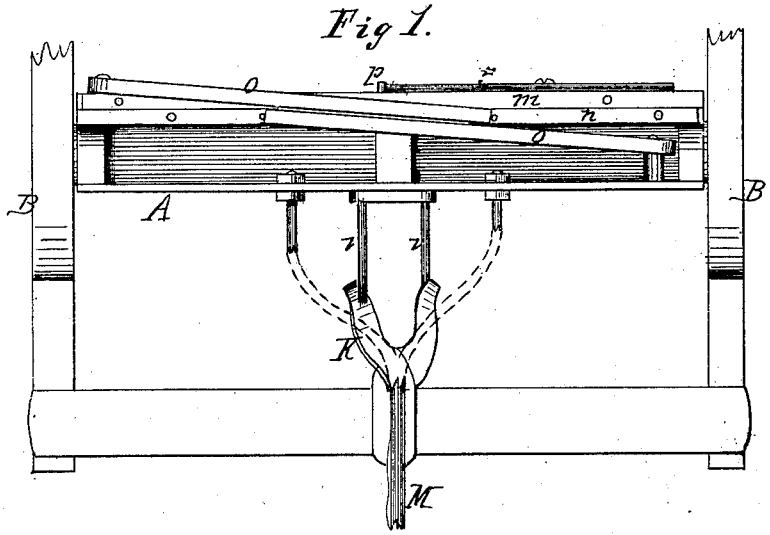
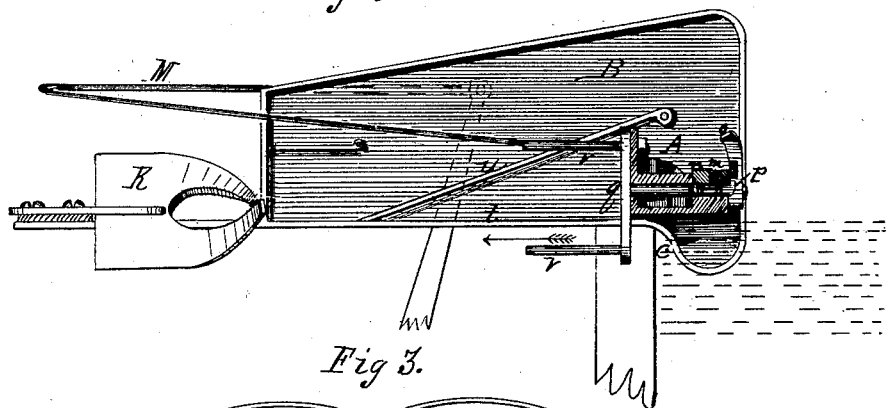
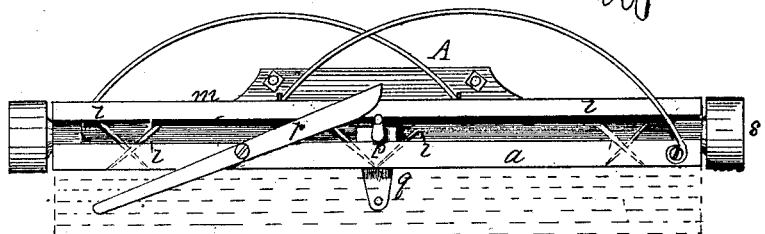

United States Patent Office.

EZRA R. ANDREWS, ROBERT B. RANDALL, AND WILLIAM H. CLAGUE, OF ROCHESTER, NEW YORK.

Letters Patent No. 114,087, dated April 25, 1871.

IMPROVEMENT IN PAPER-FEEDING MACHINES.

The Schedule referred to in these Letters Patent and making part of the same.

We, EZRA R. ANDREWS, ROBERT B. RANDALL, and WILLIAM H. CLAGUE, of Rochester, in the county of Monroe and State of New York, have invented certain Improvements in "Feeders for Book-Binding and other similar Machines," of which the following is a specification.

Our invention relates to a device in which two or more needle-points inclined in opposite directions are forced into the sheet or pamphlet, and the latter lifted and delivered to the machine, and also in certain means of operating the same.

In the drawing—

Figure 1 is a plan view of our invention.

Figure 2 is a transverse section, showing those parts to the left of the dotted line $x$, fig. 1.

Figure 3 is a rear elevation.

The feeder A is provided with one or more sets of needle-points, $l$, fig. 3, projecting obliquely from the adjustable bars $m$ and $n$, and passing through guide-openings in the bottom plate $a$.

The needles in each bar are inclined in an opposite direction to those of the other, as indicated in fig. 3, so that when forced to enter the pamphlet the latter cannot drop off as it is lifted.

The bars $m$ and $n$ are pressed downward by springs $o$, attached in a convenient manner to the frame of the feeder, and said bars are lifted, withdrawing the needle-points, and consequently dropping the pamphlet, by a partial revolution of the cam $p$, figs. 1, 2, and 3, which works between the bottom plate $a$ and the bars $m$ and $n$.

A cam-lever, $r$, pivoted to the feeder, and its outer arm projecting somewhat below the latter, trips the cam $p$ and allows the springs $o$ to force the needles into the pamphlet.

Rollers $s$, fig. 3, have bearings upon the extremities of the feeder, and move on tracks provided upon the frame B of the machine, as indicated in fig. 2.

During the forward movement of the feeder (see heavy arrow, fig. 2) these rollers run upon the horizontal track $t$, lifting in their advance the pivoted switches $u$, which drop by their own weight after the feeder has passed. Consequently, upon the return stroke of the latter the rollers rise upon the inclines $u$, until, arriving at the outer extremity of its stroke, the feeder suddenly drops from the switches upon the bank of pamphlets or paper, shown in dotted lines in figs. 2 and 3, the contact forcing up the lever $r$ and tripping the cam $p$, as before described.

A lever $q$, is secured to the spindle of the cam $p$, and is provided at its extremities with projecting fingers $v$, which, as the feeder arrives near the forward part of its stroke, come in contact with the fixed spiral inclines K, imparting a partial revolution to the cam $p$, lifting the needles' points and bars $m$ $n$, and allowing the pamphlet to drop. Thus the feeder automatically lifts up the pamphlets or sheets of paper from the "bank" at one extremity of the stroke, conveys them to the desired point, and delivers them.

The feeder is connected to any suitable working part of the machine which shall impart to it a proper reciprocating motion by the bent link M or other similar device.

The lifting movement of the feeder at the outward end of its stroke is accomplished by means of the curve in the track $t$ at the point $c$, upon which the feeder and rollers rise, lifting the pamphlets from the bank.

Our invention is chiefly intended for use in connection with the pamphlet-covering apparatus, for which application for patent has been made by Clague and Randall, but it is obvious that it is also applicable to paper-folders, printing-presses, and other machines into which many articles of a soft fibrous nature are to be fed singly.

What we claim as our invention is—

1. In combination with the needle supporting bars $m$ $n$, the elevating cam $p$, arranged to be automatically operated at each end of the movement of the feeder, for the purposes set forth.

2. In combination with the reciprocating feeder A provided with lifting-cam $p$, the fixed spiral incline K, arranged to operate substantially as set forth.

3. In combination with the reciprocating feeder A provided with a lifting-cam, $p$, the tripping-lever $r$, arranged to be operated substantially as set forth.

4. The automatic switches $u$, in combination with the reciprocating feeder A, whereby the latter is allowed to drop upon the "bank" with sufficient force to operate the tripping-lever $r$, substantially as set forth.

E. R. ANDREWS.
R. B. RANDALL.
W. H. CLAGUE.

Witnesses:
F. H. CLEMENT,
DE L. CRITTENDEN.